United States Patent

[11] 3,614,321

[72] Inventors Henry W. Shaw; Milton N. Lanford, both of Morrilton, Ark.
[21] Appl. No. 805,255
[22] Filed Mar. 7, 1969
[45] Patented Oct. 19, 1971
[73] Assignee Sound-Craft Systems, Inc. Morrilton, Ark.

[54] REMOTE FUNCTIONAL CONTROL CIRCUIT

8 Claims, 1 Drawing Fig.

[52] U.S. Cl. .......... 179/1 SW, 325/348, 325/478
[51] Int. Cl. .......... H04m 1/28, G03b 31/00
[50] Field of Search .......... 325/466, 348, 478, 64, 392, 37; 343/225, 227, 228; 179/2 A, 1 VC, 1 D, 1 SW, 1 VL; 340/167 A; 353/15

[56] References Cited

UNITED STATES PATENTS 2,547,024 4/1951 Noble .......... 325/55
3,299,404 1/1967 Yamarone et al. .......... 328/111

*Primary Examiner*—Robert L. Griffin
*Assistant Examiner*—Anthony H. Handal
*Attorney*—Buell, Blenko & Ziesenheim

ABSTRACT: We disclose a receiver of the type having an audiocircuit portion, a functional control circuit comprising a relay switch, a tone signal circuit having semiconductor switching means sensitive to presence of a certain tone signal, and additional series-connected semiconductor switch devices connected to the audiocircuit portion and to the first mentioned switching means, the presence of the certain tone signal causing the relay switch to be deactivated while enabling the audio circuit portion to function normally, but momentary interruption of the certain tone signal causing the relay switch to be activated and the audiocircuit portion to be concurrently squelched. Optionally operable switch means, connected in parallel with one of the additional series-connected semiconductor switch devices, is effective in its closed position to cause activation of the relay switch coterminously with continuance of the tone signal.

PATENTED OCT 19 1971
3,614,321
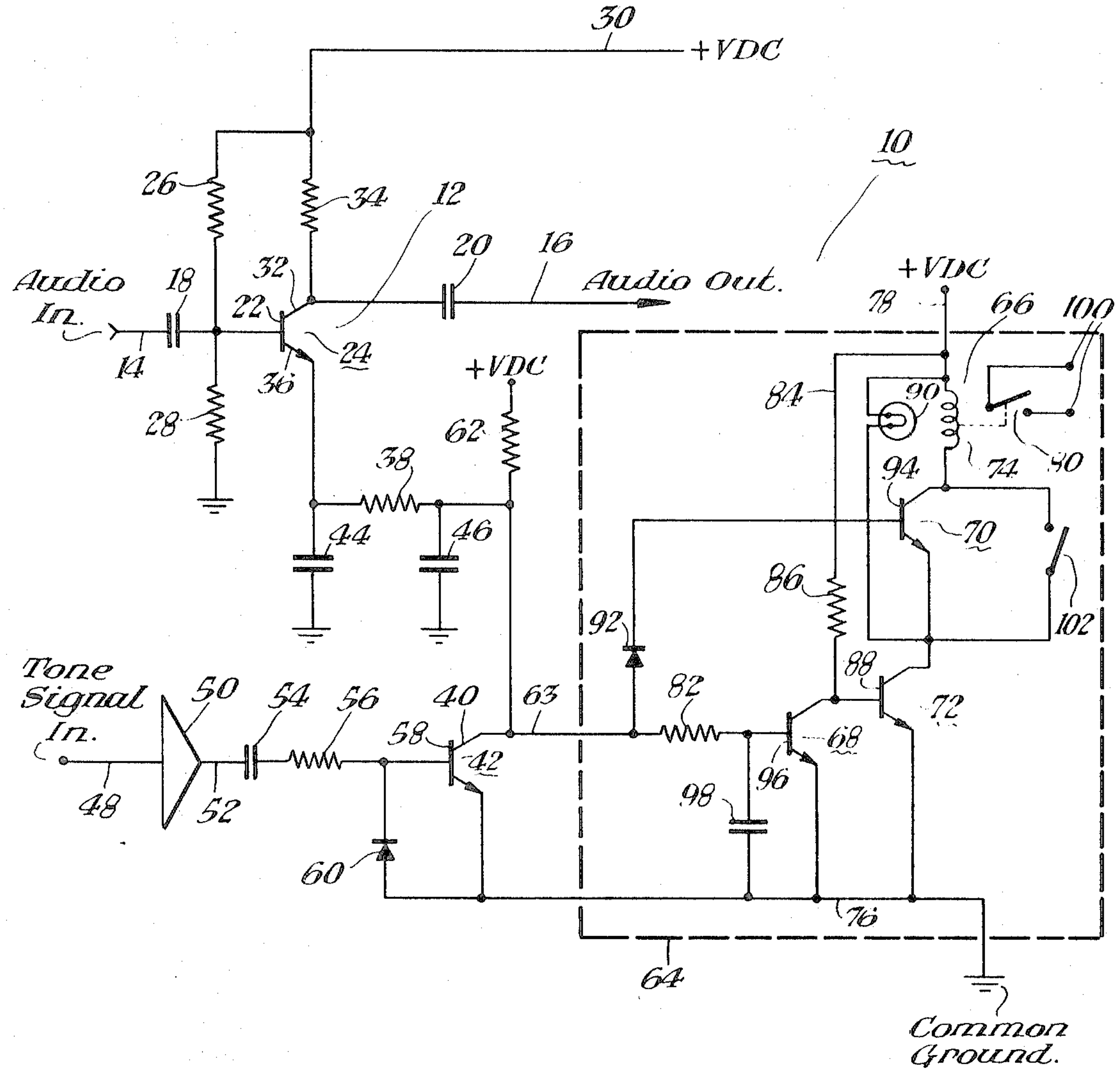
INVENTORS
Henry W. Shaw and
Milton N. Lanford.
BY
Buell Blenko & Ziesenheim
HIS ATTORNEYS

REMOTE FUNCTIONAL CONTROL CIRCUIT

The present invention relates to a Remote Functional Control Circuit and more particularly to a circuit of the character described for use in a frequency modulation receiver, wherein the audio portion of the receiver can be squelched and a functional circuit can be actuated with the use of a single transmitted tone signal.

In public address and other broadcasting systems it is frequently necessary to advance a slide projector, activate a tape recorder, flash cue lights, or the like by means of pulsing relays associated with a receiver forming part of the system. Frequently such systems are used in connection with wireless microphones, which, in the past, were provided with a first tone signal or carrier frequency for activating the receiver, for example by unsquelching its audio stage. An additional tone signal generator, which was sometimes incorporated in the wireless microphone, was required together with additional circuitry for operating additional functions associated with the system, such as the aforementioned slide projector. In addition to the duplicative circuitry required the audio and remote relay control functions were subject to various types of interference from spurious signals and related causes.

We overcome these disadvantages of the prior art by providing a radio receiver which is sensitive to a single tone transmission modulating the carrier frequency, which can be simultaneously used to activate the audio section of the receiver, when desired, and to provide interference free reception of a signal for audio and relay control functions involving the activation of the aforementioned auxiliary equipment. Control of a tape recorder by the same single tone can be accomplished by another mode of logic operation of our unique circuitry. For example, our control circuit provides unique and automatic spacing between recordings of the tape recorder to facilitate editing of the tape. Immunity from virtually all types of interference is afforded. The audio and remote control functions of our circuitry are even insensitive to carriers of the same frequency. Finally, our circuitry provides an easily operated means of switching from a pulsed-on relay action to a holding relay action by suitable manipulation of a single tone signal transmission.

We accomplish these desirable results by providing a remote control circuit comprising a tone signal circuit path having switching means sensitive to the presence of said tone signal, a relay switch and additional switching means coupled to said first mentioned switching means, said relay switch having contacts connected to open and close a load circuit, and potential storage means coupled across said additional bypassing switch means whereby the operation of said additional bypassing switch means is delayed to control the actuation of said relay switch.

We also desirably provide a similar receiver system wherein said storage means include a controlled discharge circuit therefor, and said additional switching means are coupled to said discharge circuit and to said first-mentioned switch means for actuation thereby.

We also desirably provide an audio squelch and remote control circuit comprising an audio circuit path having an audio amplifying stage, a tone signal circuit path having switching means sensitive to the presence of said tone signal for activating said audio stage, a relay switch and additional switching means connected in series and coupled to said first-mentioned switching means, said relay switch having contacts connected to open and close a load circuit, bypassing switch means connected by bypassing relation to said relay switch and said additional switching means, and potential storage means coupled across said bypassing switch means whereby the operation of said bypassing switch means is delayed to control the actuation of said relay switch.

We also desirably provide a similar receiver system wherein said additional switching means are a pair of series-connected semiconductive switches, one of said semiconductive switches being connected by said bypassing switch means and the other of said semiconductive switches being connected to said audio switch means whereby each of said semiconductive switches must be rendered conductive before said relay switch can be activated.

We also desirably provide a similar receiver system wherein an on-off switch is connected by bypassing relation to one of said semiconductive switches so that activation of one of said semiconductive switches to its conductive state activates said relay switch.

We also desirably provide a similar receiver system wherein said on-off switch is connected across that one of said semiconductive switches connected to said audio switching means so that said relay switch is activated as long as said tone signal is present.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

The accompanying drawing is a schematic circuit diagram of one form of audio squelch and remote control circuit for exemplary use in a radio receiver.

Referring now more particularly to the drawing, the audio squelch and remote control circuit 10 shown therein comprises an audio amplification stage 12, which may form part of a conventional radio receiver coupled to the audio stage 12 via conductors 14, 16 and capacitors 18, 20. The incoming audio signal on conductor 14 is coupled to base 22 of audio transistor 24 through capacitance 18. A suitable biasing current is applied to the transistor base 22 by means of resistors 26, 28 which form a voltage dividing network between ground potential and a positive DC potential on conductor 30. The aforementioned potential source also is connected to transistor collector 32 through load resistance 34.

Emitter 36 of the audio transistor 24 is coupled through resistance 38 to collector 40 of a switching or audio squelch transistor 42. Capacitor 44 bypasses the unwanted audio components of the signal developed across the resistance 38 and additionally in conjunction with capacitor 46 bypass the undesirable signal components of the tone signal present ax collector 40 of switching transistor 42. When the collector 40 of the switching transistor 42 is substantially at ground or zero potential as set forth below, the audio transistor 24 typically operates as an audio amplifier.

A typical tone signal is supplied to the control circuit 10 on conductor 48. The conductor 48 for this purpose can be connected to a typical demodulated audio output of an FM receiver (not shown) for receiving the tone signal from a wireless microphone such as that described and claimed in our copending coassigned application, Ser. No. 805,254 filed Mar. 7, 1969 concurrently herewith and entitled "Wireless Microphone." Alternatively, input conductor 48 can be direct-connected at a conventional wired microphone having a local tone generating circuit or to another suitable source of control signal.

From the input conductor 48 the tone signal is supplied to a conventional amplifying circuit 50, which in this example is a frequency selective amplifier of known construction and tuned to he tone signal frequency.

The amplified signal output of the amplifier 50 on conductor 52 is coupled through capacitor 54 and resistance 56 to base electrode 58 of the switching transistor 42. Diode 60 bypasses the negative peaks of the amplified tone signal to ground and thus allows only the positive component to appear at the transistor base 58. When the positive component of the tone signal reaches a predetermined amplitude, the switching transistor 42 becomes conductive such that a small positive potential appears on collector 40 of the switching transistor 42 from collector load resistance 62. At this low potential of collector voltage, the resistor 38 essentially is direct-connected to ground through the switching transistor 42. This permits the audio stage transistor 24 and associated circuit components to perform as an amplifier.

In the absence of a tone signal on conductor 52, switching transistor 42 remains nonconductive and the static potential on its collector 40 will rise to approximately the supply voltage on conductor 30. This prevents the audio transistor 24 from amplifying any audio signal that may be applied to input conductor 14.

The circuit described thus far essentially is a tone-actuated audio amplifier and requires the presence of both an audio input signal on conductor 14 and the tone signal on conductor 48 in order that the audio stage 12 can supply an amplified output signal on output conductor 16 to a subsequent power amplifier stage or other suitable load circuit (not shown.

The output of the switching transistor 42 is supplied on conductor 63 to a remote control circuit denoted generally by reference character 64. The remote control circuit 64 includes a relay switch 66, switching transistor 68, and series-connected transistors 70, 72. The series connection of the transistors 70, 72 requires that both of these transistors must be conducting in order to pass an energizing current through relay coil 74 from common ground conductor 76 to a source of voltage of suitable positive potential (not shown) coupled to conductor 78, in order to close the switch contacts 80.

To appraise the operation of the relay switch 66, the condition of the circuit 10 in the absence of a tone signal on conductor 48 will first be considered. The static potential on collector 40 of the then nonconductive switching transistor 42 will be very close to the positive supply potential as noted earlier. Switching transistor 68 of the remote control circuit 64 will be biased at that time to its conducting condition through resistors 62 and 82. This switching transistor 68, therefore, will bypass all current from supply conductor 78 through conductor 84 and resistance 86 to ground. Hence, series transistor 72 remains nonconductive in the absence of sufficient potential on its base electrode 88. Indicator lamp 90 will not be energized since transistor 72 is nonconductive and blocks the path to ground. Although diode 92 applies the potential from resistor 62 to base electrode 94 of series transistor 70, the latter transistor cannot turn on because the path of its emitter-collector circuit to ground is blocked by the other series transistor 72. Therefore, in the absence of a tone signal on input conductor 48 the relay switch 66 cannot be activated.

Consider now the application of a tone signal of proper frequency at the input conductor 48. Switching transistor 42 is turned on so that a turn-on potential is no longer applied to base 94 of series transistor 70 through the diode 92. Therefore, transistor 70 remains nonconductive. Switching transistor 68 likewise will lose its turn-on current at its base electrode 96 and will become nonconductive after a slight delay caused by discharge of the stored potential in capacitor 98. As transistor 68 turns off, turn-on current supplied through resistor 86 is applied to base 88 of series transistor 72. Transistor 72, therefore becomes conductive through lamp 90, which thus indicates the presence of a tone signal on input conductor 48. However, relay switch 66 cannot be activated at this time since the other series transistor 70 is turned off. The mere application of a tone signal on conductor 48 turns one series transistor 70 off and the other series transistor 72 on (which energizes indicator lamp 90) but no condition exists whereby both series transistors 70, 72 are on at the same time to activate the relay switch 66.

It will be assumed now that a momentary break occurs in the application of the tone signal to the conductor 48. Such break or interruption in the tone signal may be of the order of one-half second and can be provided typically by depressing a push button switch at the transmitter (not shown). At this time the switching transistor 42 turns off as described above. The resistor 62 then supplies turn-on current through diode 92 to the base 94 of the series transistor 70. However, turn-on current is also being supplied to base 88 of the other series transistor 72 through resistor 86 since switching transistor 68 was turned off at the beginning of the break in the tone signal. Since both of the series transistors 70, 72 are now conductive, relay switch 66 is activated to close contacts 80 and to actuate an auxiliary load device such as a slide projector or cue lights (not shown) connected to terminals 100. The indicator lamp 90 remains on during this activation of the relay switch 66.

The relay switch 66 remains activated for a predetermined length of time because resistor 62 cannot provide instant turn-on current for switching transistor 68, as the resistor 62 must first charge capacitor 98 through resistor 82. The ensuing delay in turning on switching transistor 68 correspondingly delays the eventual turn off of series transistor 72 and deactivation of relay switch 66 and lamp 90. This delay in the deactivation of the switch 66 can be adjusted by varying the time constant of the resistor 82 and capacitor 98, and typically should be in the order of 1 or 2 seconds. When switch 66 completes deactivation, the remote control circuit 10 will be in the state as described earlier as the condition of absence of tone. In order to prepare to repeat the process of pulsing on relay 66 a tone must be reapplied such as would be provided by the aforementioned transmitter when the pushbutton is released.

As noted above the switch contact 80 and associated circuitry including the terminals 100 can be used to perform a wide variety of momentary circuit closing functions such as typically required to advance or index a slide projector, flash cue lights, activate recording devices or the like. During the momentary break or interruption in the tone signal, the audio stage utilizing transistor 24 will be inoperative, although this presents no problem in typical usage. If the tone break is less than the time constant requirements for turning off series transistor 72, the relay switch 66 will be activated during exactly the tone break interval, and the indicator lamp 90 will remain on.

In accord with another feature of our invention, it is contemplated that the load circuit including terminals 100 can be continuously activated throughout a continuous application of the tone signal rather than for a brief interval during a momentary interruption of a continuously applied tone signal. In furtherance of this purpose a bypassing switch 102 is connected across the emitter-collector circuit of the series transistor 70. When the switch 102 is opened as shown, the circuit 10 functions in the manner described above.

The operation of the circuit 10 with the switch 102 closed will now be described. In an absence of tone signal on the input conductor 48, the switching transistor 42 is turned off, as described above. At this time resistors 62 and 82 supply a turn-on current to base 96 of switching transistor 68. Current from resistor 86 is bypassed through the transistor 68 to prevent series transistor 72 from being turned on. The indicator lamp 90 remains off and the relay switch 66 cannot be activated. The diode 92 cannot turn on the other series transistor 70 as the latter is shorted by closure of the switch 102.

With application of a tone signal to conductor 48, the switching transistor 42 is turned on. This immediately diverts turn-on current from resistor 62 to ground and the other switching transistor 68 will turn off after a slight delay owing to the charge stored in the capacitor 98 as explained above. After the discharge interval of the capacitor 98, resistor 86 furnishes turn-on current for series transistor 72. This energizes indicator lamp 90 and the relay switch 66 through the closed switch 102 and associated circuit components. These conditions will exist as long as the tone signal is applied to conductor 48.

Consider now a termination of the tone signal on conductor 48. Resistors 62, 82 then furnish current to turn on the second switching transistor 68, owing to the then nonconductive state of the first switching transistor 42. The switching transistor 68 however is delayed in turning-on as resistors 62, 82 must first charge capacitor 98. The attendant delay may be on the order of 1 to 2 seconds as explained previously. After eventual turn-on of the second switching transistor 68, current through resistor 86 is again diverted to ground and series transistor 72 will be turned off, and with it indicator lamp 90. Turning off transistor 72, of course, deactivates relay switch 66, but only following the aforementioned delay period after termination of the tone signal.

The existence of the aforementioned delay period in opening the relay contacts 80 (with switch 102 closed) is useful in many applications. In tape recording, for example, the delay periods provide a automatic spacing between recording intervals to facilitate editing.

The audio and tone signals on conductors 14, 48 respectively can be taken from the detector stage of an FM type receiver in accordance with known circuit considerations. The advantage of a single tone signal system for performing both the function of audio squelching and relay switch pulsing or closing are readily apparent in the simplifications of both transmitting and receiving circuitry. The control circuit 10 is particularly advantageous when the tone signal is being transmitted by a low powered transmitter such as a wireless microphone or the like. These advantages can be enumerated as follows:

a. The transmitter requires only a single frequency to perform dual functions;
b. The tone signal can be above the audible range and therefore can be continuously transmitted as a carrier. This endows the receiver circuit with continuous immunity to interference from undesired signals of the same frequency when the proper transmitter is turned off.
c. Selectivity requirements are considerably reduced in the disclosed single tone system and the resultant circuitry is less complex as compared to a multiple tone system;
d. The transmitter requires only a single control to interrupt its tone generating circuit in order to close the relay switch 66.

From the foregoing it will be apparent that novel and efficient forms of Remote Functional Control Circuits have been described herein. While we have shown and described certain presently preferred embodiments of the invention and have illustrated presently preferred methods of practicing the same, it is to be distinctly understood that the invention is not limited thereto but may be variously embodied within the scope of the following claims.

We claim:

1. An audio squelch and remote control circuit comprising an audio circuit path having an audio amplifying stage, a tone signal circuit having a first semiconductive switch connected therein so as to be turned on responsively to the presence of a tone signal in said tone signal circuit, said first switch being also connected to said audio stage so that said audio stage is activated when said first switch is turned on, a second semiconductive switch and capacitance means connected in said tone signal circuit so that said second switch is turned off and turned on after a predetermined delay interval following turning on and turning off respectively of said first semiconductive switch, a relay having an actuating coil and a pair of semiconductive devices connected in series with each other and with said coil to a source of operating potential, one of said pair of semiconductive devices being connected to said second switch so that said one of said pair of semiconductive devices can be turned on as said second switch is turned off, the other of said pair of semiconductive devices being connected to said first semiconductive switch so that the other of said pair of semiconductive devices can be turned on when said first switch is turned off with the result that said pair of semiconductive devices are momentarily concurrently turned on upon a momentary interruption of said tone signal thereby causing energization of said relay coil.

2. The combination according to claim 1 wherein on-off switch means are connected in shunt relation to said other of said pair of semiconductive devices so that with said on-off switch means in closed position, said one of said pair of semiconductive devices is individually effective to cause energization of said relay coil so long as a tone signal endures in said tone signal circuit.

3. The combination according to claim 1 wherein an indicator lamp is connected in an energizing circuit in series relation to said one of said pair of semiconductive devices and energized under control of said one of said pair of semiconductive devices when turned on responsive to establishment of a tone signal in said tone signal path, to give visual indication of the presence of said tone signal in said tone signal path.

4. An audio squelch and remote control circuit comprising an audio circuit path having an audio amplifying stage, a tone signal circuit path having a first switching means operatively sensitive to the presence of a certain tone signal in said tone signal circuit path for activating said audio stage, a relay having contacts and an actuating coil therefor, a second switching means operatively responsive to said first switching means upon establishment and interruption of said certain tone signal, potential storage means operatively associated with said second switching mean for delaying actuation thereof responsive to a change in the operative condition of the first switching means, first and second switching devices connected in series with each other and with said actuating coil to a source of potential to thereby control actuation of said relay, said first switching device being responsive to said first switching means and said second switching device being responsive to said second switching means, said first and second switching devices being concurrently conducting only upon a momentary interruption of said tone signal.

5. The combination according to claim 4 wherein said first and said second switching devices are semiconductive devices the bias on which is respectively controlled according to the operative condition of said first switching means and said second switching means.

6. The combination according to claim 4 wherein is provided a charging circuit and a discharging circuit for said potential storage means, said charging circuit being established responsively to turn-off of said first switching means in consequence of interruption of a tone signal in said tone signal path to delay for a certain time the turn-on of said second switching means, and said discharging circuit being established responsively to turn-on of said first switching means in consequence of establishment of a tone signal in said tone signal path, to delay for a certain time the turn-off of said second switching means.

7. The combination according to claim 4 wherein said first switching device is turned on responsively to turn-off of said first switching means upon interruption of said tone signal, termination said second switching device is turned off responsively to turn-on of said second switching means following an interval of time delay effected by charging of said potential state means, the interval of time during which said first and second switching devices are concurrently turned-on determining the length of time the said coil is energized to activate said relay.

8. The combination according to claim 7 wherein an on-off switch is connected in shunt relation to said first switching device so that turn-on of only said second switching device effects energization of the coil of said relay, said second switching device being turned-on responsively to turn-off of said second switching means under control of said first switching means so long as a tone signal endures in said tone signal circuit.

UNITED STATES PATENT OFFICE
CERTIFICATE OF CORRECTION

Patent No. 3,614,321 Dated October 19, 1971

Inventor(s) Henry W. Shaw, et al

It is certified that error appears in the above-identified patent and that said Letters Patent are hereby corrected as shown below:

Column 1, line 65, "by" should read -- in -- ; line 73, "by" should read -- to -- . Column 2, line 4, "by" should read -- in -- ; line 40, "ax" should read -- at -- ; line 53, "at" should read -- to -- ; line 59, "he" should be -- the -- . Column 3, line 12, after "shown." add -- ) -- . Column 5, line 6, delete "a" . Column 6, line 22, "mean" should read -- means -- ; lines 50 and 51, cancel "termination" and insert -- and -- ; line 54, cancel "state" and insert -- storage -- .

Signed and sealed this 14th day of November 1972.

(SEAL)
Attest:

EDWARD M.FLETCHER,JR.
Attesting Officer

ROBERT GOTTSCHALK
Commissioner of Patents